(12) United States Patent
Okazawa

(10) Patent No.: US 9,451,160 B2
(45) Date of Patent: *Sep. 20, 2016

(54) IMAGING APPARATUS AND METHOD FOR CONTROLLING THE IMAGING APPARATUS

(71) Applicant: Olympus Corporation, Hachioji-shi, Tokyo (JP)

(72) Inventor: Atsuro Okazawa, Hachioji (JP)

(73) Assignee: Olympus Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/857,115

(22) Filed: Sep. 17, 2015

(65) Prior Publication Data

US 2016/0006931 A1  Jan. 7, 2016

Related U.S. Application Data

(63) Continuation of application No. 14/535,008, filed on Nov. 6, 2014, now Pat. No. 9,167,181, which is a continuation of application No. PCT/JP2013/066245, filed on Jun. 12, 2013.

(30) Foreign Application Priority Data

Jun. 14, 2012 (JP) .................... 2012-134730

(51) Int. Cl.
*H04N 5/232* (2006.01)
*H04N 5/265* (2006.01)
(Continued)

(52) U.S. Cl.
CPC ............ *H04N 5/23229* (2013.01); *G02B 7/34* (2013.01); *H04N 5/2176* (2013.01); *H04N 5/265* (2013.01);
(Continued)

(58) Field of Classification Search
CPC .......... H04N 5/23212; H04N 5/3696; H04N 5/343; H04N 5/3456; H04N 5/347
See application file for complete search history.

(56) References Cited

U.S. PATENT DOCUMENTS

2009/0135289 A1  5/2009  Kusaka
2010/0214452 A1  8/2010  Kawarada
(Continued)

FOREIGN PATENT DOCUMENTS

JP    3592147    11/2004
JP    2007-279597    10/2007
(Continued)

OTHER PUBLICATIONS

International Search Report to PCT/JP2013/066245 (3 pgs.) with translation (2 pgs.).
(Continued)

*Primary Examiner* — Paul Berardesca
(74) *Attorney, Agent, or Firm* — John C. Pokotylo; Straub & Pokotylo

(57) ABSTRACT

An imaging apparatus includes an imaging element, a reading scheme setting unit, and an image processing unit. A phase-difference detecting pixel for detecting a focal point is arranged at part of the imaging pixels of the imaging element. The reading scheme setting unit sets a reading scheme for reading pixel data from the imaging pixels and phase-difference detecting pixel. The image processing unit corrects the pixel data of the phase-difference detecting pixel. The image processing unit performs the correction, to change a use ratio of the pixel data of the phase-difference detecting pixel to the data interpolated from the pixels adjacent to the phase-difference detecting pixel.

9 Claims, 9 Drawing Sheets

(51) Int. Cl.
*H04N 5/365* (2011.01)
*H04N 5/217* (2011.01)
*H04N 5/345* (2011.01)
*H04N 5/343* (2011.01)
*H04N 5/347* (2011.01)
*H04N 9/04* (2006.01)
*G02B 7/34* (2006.01)
*H04N 5/369* (2011.01)

(52) U.S. Cl.
CPC .............. *H04N 5/343* (2013.01); *H04N 5/347* (2013.01); *H04N 5/3456* (2013.01); *H04N 5/3651* (2013.01); *H04N 5/3696* (2013.01); *H04N 9/045* (2013.01); *H04N 5/23212* (2013.01); *H04N 2209/045* (2013.01)

(56) References Cited

U.S. PATENT DOCUMENTS

| | | |
|---|---|---|
| 2011/0085785 A1 | 4/2011 | Ishii |
| 2011/0285899 A1 | 11/2011 | Hirose |
| 2013/0107067 A1 | 5/2013 | Miyakoshi |

FOREIGN PATENT DOCUMENTS

| | | |
|---|---|---|
| JP | 2010-062640 | 3/2010 |
| JP | 2010-181751 | 8/2010 |
| JP | 2010-271670 | 12/2010 |
| JP | 2011-081271 | 4/2011 |
| JP | 2011-199493 | 10/2011 |
| JP | 2011-244288 | 12/2011 |
| JP | 2011-250325 | 12/2011 |
| JP | 2012-088617 | 5/2012 |
| WO | WO 2010/137444 | 12/2010 |

OTHER PUBLICATIONS

Notification of Transmittal of Translation of the International Preliminary Report on Patentability (PCT/IB/338) with International Preliminary Report on Patentability (PCT/IB/373) and with English translation of the Written Opinion of the International Searching Authority ("ISA") (PCT/ISA/237) for International Patent Application No. PCT/JP2013/066245, mailed on Dec. 24, 2014 (9 pgs.).
Supplementary European Search Report to European Application No. 13803935, mailed on Oct. 15, 2015 (2 pgs.).

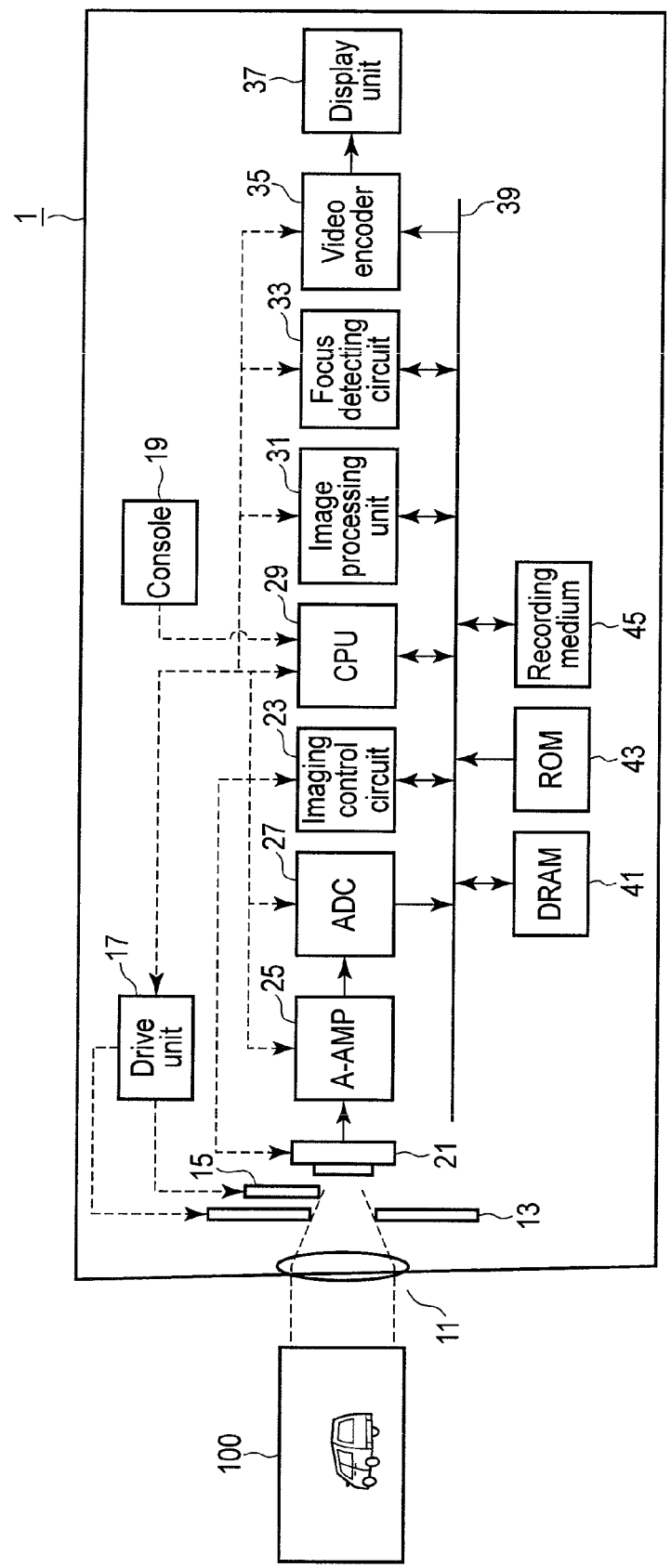
F I G. 1

FIG. 3

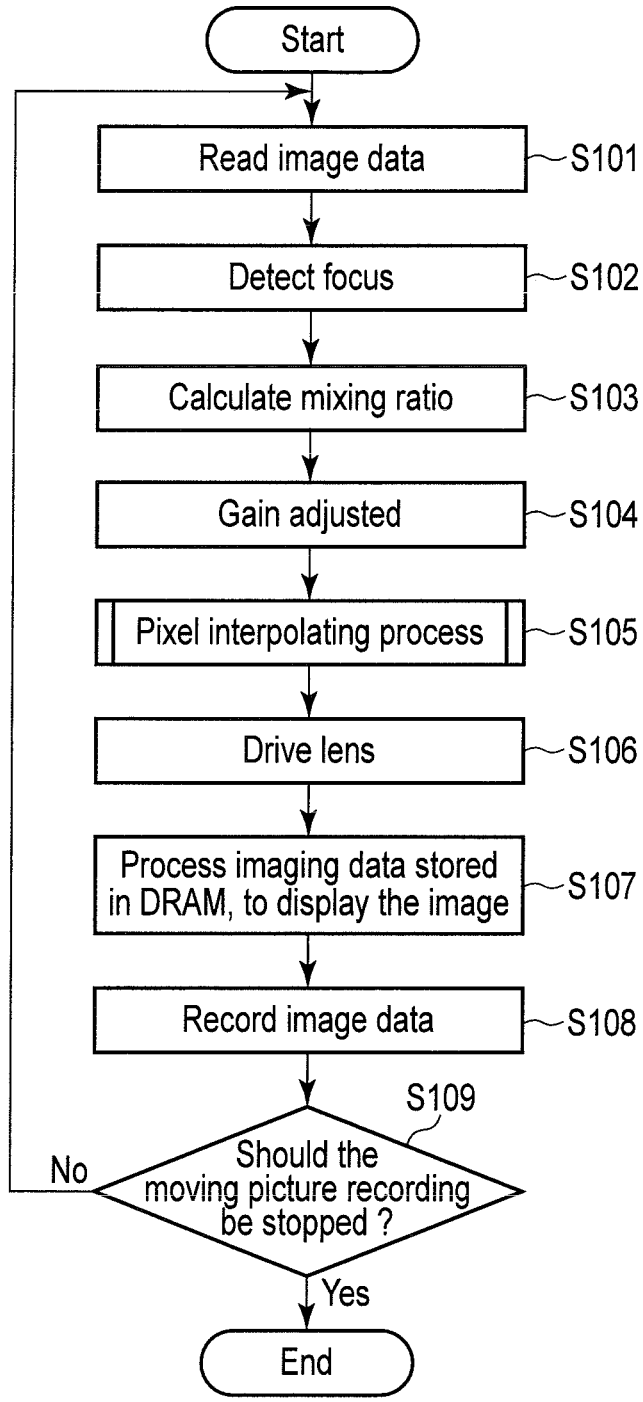
F I G. 5

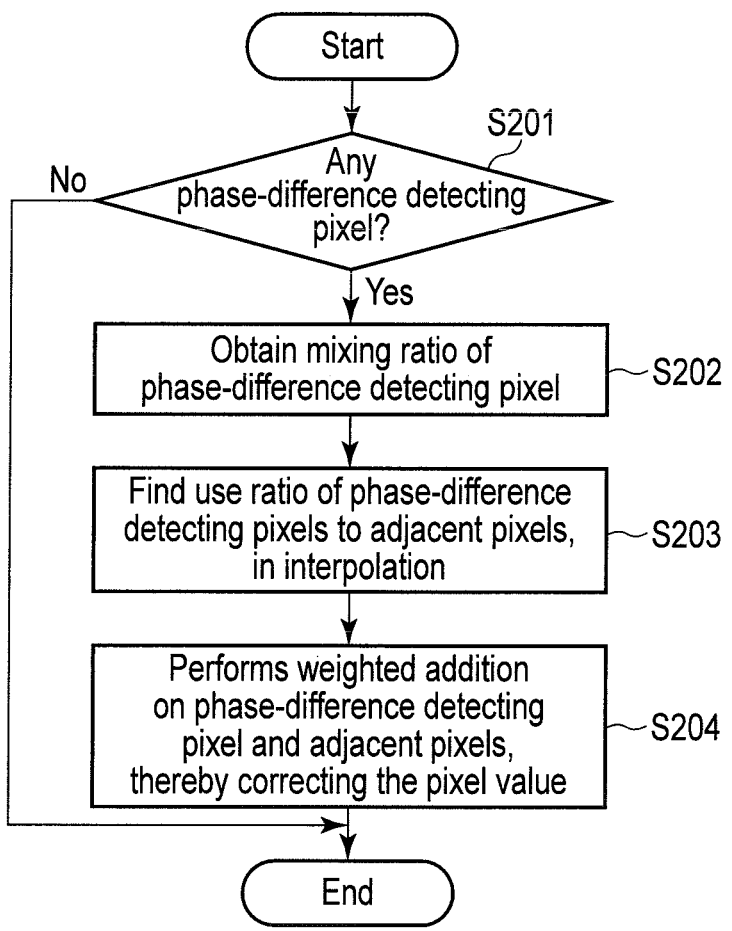
F I G. 8

IMAGING APPARATUS AND METHOD FOR CONTROLLING THE IMAGING APPARATUS

CROSS-REFERENCE TO RELATED APPLICATIONS

This application is a Continuation application of U.S. patent application Ser. No. 14/535,008 (referred to as "the '008 application" and incorporated herein by reference), filed on Nov. 6, 2014, titled "IMAGING APPARATUS AND METHOD FOR CONTROLLING THE IMAGING APPARATUS" and listing Atsuro OKAZAWA as the inventor, the '008 application being a Continuation application of PCT Application No. PCT/JP2013/066245, filed Jun. 12, 2013 and based upon and claiming the benefit of priority from the prior Japanese Patent Application No. 2012-134730, filed Jun. 14, 2012, the entire contents of both of which are incorporated herein by reference.

BACKGROUND OF THE INVENTION

1. Field of the Invention

This invention relates to an imaging apparatus in which some of the pixels are used as elements for detecting phase differences to detect the focusing state, and relates also to a method for controlling the imaging apparatus.

2. Description of the Related Art

Japanese Patent No. 3592147, for example, proposes an imaging apparatus in which some of the pixels of the imaging element are used to detect the focusing state. In the imaging apparatus proposed in Japanese Patent No. 3592147, some of the pixels of the imaging element are set as phase-difference detecting pixels, the beams coming from an object through different pupil regions symmetric to the optical axis of the photographing lens are focused on a plurality of phase-difference detecting pixels, and the phase difference between these object beams is detected, ultimately detecting the focusing state of the photographing lens.

Each phase-difference detecting pixel is shielded from light, for example in one part, and receives only one of the light beams coming through the different pupil regions of the photographing lens. Consequently, the phase-difference detecting pixels are defective, and cannot be used to form an image. In the apparatus proposed in Japanese Patent No. 3592147, the signals output from the phase-difference detecting pixels are therefore interpolated by using the signals output from the adjacent pixels of the same color. If such interpolation is performed on an object of high spatial frequency, however, the image sharpness will decrease. In the imaging apparatus disclosed in Jpn. Pat. Appin. KOKAI Publication No. 2010-062640, the difference (in special frequency) between the output signals of the pixels surrounding any phase-difference detecting pixel is detected, and the ratio of the gain adjusting value to the interpolation correcting value is determined from the difference (in special frequency) detected.

BRIEF SUMMARY OF THE INVENTION

According to a first aspect of the invention, an imaging apparatus comprises: an imaging element including imaging pixels and a phase-difference detecting pixel arranged at a part of the imaging pixels to detect a focal point; a reading scheme setting unit configured to set a reading scheme for reading pixel data from the imaging pixels and phase-difference detecting pixel of the imaging element; and an image processing unit configured to correct the pixel data of the phase-difference detecting pixel, wherein the image processing unit corrects the pixel data to change a use ratio of the pixel data of the phase-difference detecting pixel to data interpolated from pixels adjacent to the phase-difference detecting pixel, the pixel data of the phase-difference detecting pixel having been read in accordance with the reading scheme set by the reading scheme setting unit, wherein the image processing unit comprises: a gain adjusting unit configured to adjust a gain of the pixel data read from the phase-difference detecting pixel in the reading scheme set by the reading scheme setting unit; a pixel interpolating unit configured to perform weighted arithmetic addition on the pixel data read from the phase-difference detecting pixel and adjusted in gain and the pixel data of the imaging pixels surrounding the phase-difference detecting pixel; and an interpolation ratio determining unit configured to determine, as the use ratio, a weighting coefficient used in the weighted addition, in accordance with the reading scheme set by the reading scheme setting unit, wherein the gain adjusting unit changes a value for adjusting the gain of the pixel data, in accordance with the reading scheme set by the reading scheme setting unit, and wherein the pixel interpolating unit decreases the weighting coefficient of the pixel data of the phase-difference detecting pixel adjusted in gain, as a mixing ratio of the pixel data of the phase-difference detecting pixel increases in the pixel data read in accordance with the reading scheme, the mixing ratio determined in accordance with arrangement of the phase-difference detecting pixel included mixed pixel data if a plurality of pixel data are mixed in the reading scheme.

According to a second aspect of the invention, a method for controlling an imaging apparatus comprises: setting a reading scheme for reading pixel data from the imaging pixels and phase-difference detecting pixel of an imaging element, the phase-difference detecting pixel arranged at a part of the imaging pixels and configured to detect a focal point; and correcting the pixel data of the phase-difference detecting pixel by means of changing a use ratio of the pixel data of the phase-difference detecting pixel to data interpolated from pixels adjacent to the phase-difference detecting pixel, the pixel data of the phase-difference detecting pixel having been read in accordance with the reading scheme set, wherein the correcting the pixel data of the phase-difference detecting pixel comprises: adjusting a gain of the pixel data read from the phase-difference detecting pixel in the reading scheme; performing weighted arithmetic addition on the pixel data read from the phase-difference detecting pixel and adjusted in gain and the pixel data of the imaging pixels surrounding the phase-difference detecting pixel; and determining, as the use ratio, a weighting coefficient used in the weighted addition, in accordance with the reading scheme, and wherein the determining the weighting coefficient comprises: changing a value for adjusting the gain of the pixel data, in accordance with the reading scheme; and decreasing the weighting coefficient of the pixel data of the phase-difference detecting pixel adjusted in gain, as a mixing ratio of the pixel data of the phase-difference detecting pixel increases in the pixel data read in accordance with the reading scheme, the mixing ratio determined in accordance with arrangement of the phase-difference detecting pixel included mixed pixel data if a plurality of pixel data are mixed in the reading scheme.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a block diagram showing the configuration of a digital camera that is an example of an imaging apparatus according to one embodiment of this invention;

FIG. 3 is a diagram showing the pixel arrangement in an imaging element;

FIG. 5 is a flowchart showing how the imaging apparatus records a moving picture;

FIG. 6A is a diagram showing how pixels are arranged before 2×2 pixel-mixture reading;

FIG. 6B is a diagram showing how pixels are arranged after the 2×2 pixel-mixture reading;

FIG. 8 is a flowchart showing how a pixel interpolating process is performed.

DETAILED DESCRIPTION OF THE INVENTION

Figure 2:
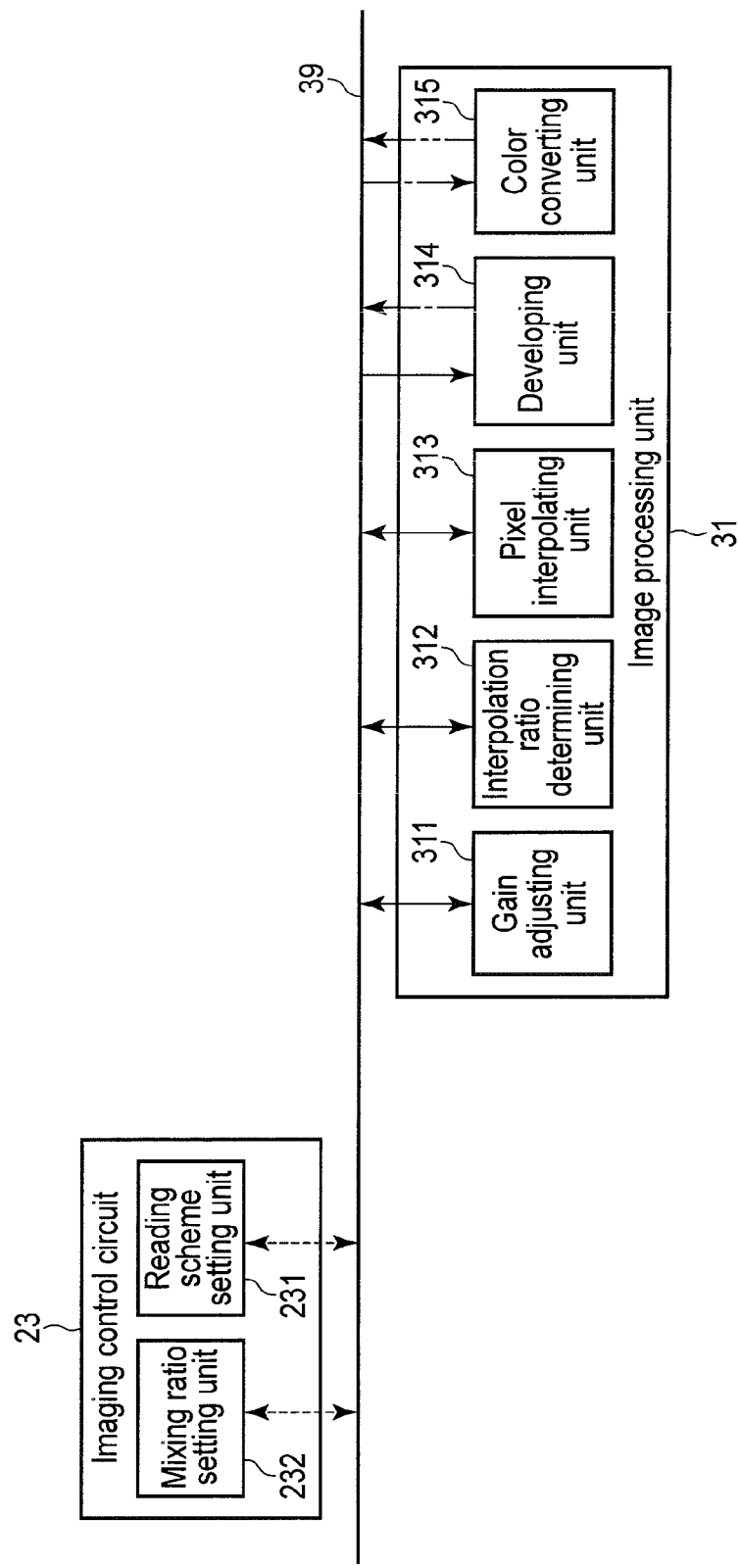
FIG. 2 is a diagram showing, in detail, an imaging control circuit and an image processing unit.

An embodiment of this invention will be described below, with reference to the accompanying drawing.

FIG. 1 is a block diagram showing the configuration of a digital camera (hereinafter, referred to as "camera") that is an example of an imaging apparatus according to one embodiment of this invention. In FIG. 1, the solid-line arrows indicate the flow of data, and the broken-line arrows indicate the flow of control signals.

The camera 1 shown in FIG. 1 has a photographing lens 11, a diaphragm 13, a mechanical shutter 15, a drive unit 17, a console 19, an imaging element 21, an imaging control circuit 23, an A-AMP 25, an analog-to-digital converter (ADC) 27, a central processing unit (CPU) 29, an image processing unit 31, a focus detecting circuit 33, a video encoder 35, a display unit 37, a bus 39, a dynamic random access memory (DRAM) 41, a read only memory (ROM) 43, and a recording medium 45.

The photographing lens 11 has one or more lenses for forming an image of an object 100 at the imaging element 21. The photographing lens 11 may be a single-focus lens or a zoom lens. The diaphragm 13 is arranged on the optical axis of the photographing lens 11, and has a variable aperture diameter. The diaphragm 13 controls the intensity of the light beam coming from the object 100 and passing through the photographing lens 11.

The mechanical shutter 15 is arranged at the rear of the diaphragm 13, and is configured to open and close. As its opening time is adjusted, the mechanical shutter 15 adjusts the time the light beam coming from the object 100 is applied to the imaging element 21 (i.e., exposure time for the imaging element 21). A focal plane shutter or a lens shutter, either well known, or the like may be used as mechanical shutter 15.

The drive unit 17 adjusts the focal point of the photographing lens 11 and aperture diameter of the diaphragm 13 and opens or closes the mechanical shutter 15, in accordance with the control signal supplied from the CPU 29.

The console 19 includes various operation members such as a power button, a release button, a playback button, a menu button and a touch panel. The console 19 detects the operation state of any operation member, and outputs, to the CPU 29, a signal showing any operation state detected. A photographing mode of the camera 1 may be selected at the console 19. That is, the user may rotate the photographing mode dial, which is one of the operation members provided at the console 19, to select the still-picture photographing mode or the moving-picture photographing mode. In the still-picture photographing mode, the camera 1 photographs still pictures. In the moving-picture photographing mode, the camera 1 photographs moving pictures. The photographing mode may be selected by touching the touch panel instead of by rotating the dial.

The imaging element 21 is arranged on the optical axis of the photographing lens 11, at the rear of the mechanical shutter 15 and at the position where the photographing lens 11 focuses the light beam coming from the object 100. The imaging element 21 comprises photodiodes, serving as pixels, which are arranged in a two-dimensional pattern. In this embodiment, the imaging element 21 has imaging pixels for acquiring an image to record or display, and phase-difference detecting pixels for detecting the focal point.

The photodiodes constituting the imaging element 21 generate electrical charges corresponding to the amounts of light they receive. The electrical charge of each photodiode generates is accumulated in the capacitor connected to the photodiode. The charge accumulated in the capacitor is read as an image signal. In this embodiment, the imaging element 21 has different charge reading schemes. The electrical charge accumulated in the imaging element 21 is read out, in response to a control signal coming from the imaging control circuit 23.

In front of the photodiodes constituting the pixels, a color filter of, for example the Bayer arrangement, is provided. The Bayer arrangement has lines in which R pixels and G (Gr) pixels are alternately arranged in the horizontal direction, and lines in which G (Gb) pixels and B pixels are alternately arranged in the horizontal direction.

In this embodiment, the phase-difference detecting pixels are arranged at some of the imaging pixels. The pixels used as phase-difference detecting pixels differ from any other pixels. Each phase-difference detecting pixel is shielded from light, for example in one part. The imaging element 21 will be described later in detail.

The imaging control circuit 23 sets a reading scheme for the imaging element 21 in accordance with the control signal coming from the CPU 29. The imaging control circuit 23 then controls the reading of image signals from the imaging element 21 in accordance with the reading scheme so set. The imaging control circuit 23 will be described later in detail.

The A-AMP 25 adjusts the analog gain of any image signal output from the imaging element 21. The ADC 27 is an analog-to-digital converter, and converts the image signal A-AMP 25 has adjusted in terms of analog gain, to an image signal (pixel data). Hereinafter, a group of pixels data will be referred to as "imaging data."

The CPU 29 controls the other components of the camera 1 in accordance with the programs stored in the ROM 43, which will be described later.

The image processing unit 31 performs various image processes on the imaging data, generating image data. To record a still picture, for example, the image processing unit 31 processes the imaging data, generating still picture data. Similarly, to record a moving picture, the image processing unit 31 processes the imaging data, generating moving picture data. To display a live view, the image processing unit 31 performs a display image process, generating display image data. The configuration of the image processing unit 31 that performs these image processes will be described later in detail.

The focus detecting circuit 33 acquires pixel data from the phase-difference detecting pixels, and performs a known phase-difference detecting method, calculating the defocus direction and defocus value from the pixel data.

The video encoder 35 reads the display image data generated by the image processing unit 31 and temporarily stored in the DRAM 41. The video encoder 35 then outputs the display image data to the display unit 37.

The display unit 37 is, for example, a liquid crystal display or an organic EL display, and is arranged on, for example, the back of the camera 1. The display unit 37 displays the image represented by the display image data input from the video encoder 35. The display unit 37 is used to display live views or the images already recorded.

The bus 39 is connected to the ADC 27, CPU 29, image processing unit 31, focus detecting circuit 33, video encoder 35, DRAM 41, ROM 43 and recording medium 45. The various data generated in these components are transferred through the bus 39.

The DRAM 41 is an electrically programmable memory, and temporarily stores various data, such as imaging data (pixel data), record image data, display image data and data processed in the CPU 29. To store the data temporarily, a synchronous dynamic random access memory (SDRAM) may be used. The ROM 43 is a nonvolatile memory such as a mask ROM or a flash memory. The ROM 43 stores various data such as the programs for use in the CPU 29 and the values for adjusting the camera 1. The recording medium 45 is incorporated in the camera 1 or is removably provided in the camera 1, and records the record image data in the form of an image file of a specific format.

FIG. 2 is a diagram showing, in detail, the imaging control circuit 23 and the imaging control circuit and the image processing unit 31. In FIG. 2, the components other than the imaging control circuit 23 and image processing unit 31 are not shown. In FIG. 2, the solid-line arrows indicate the flow of the imaging data (pixel data), the broken-line arrows indicate the setting data for the imaging control circuit 23, and the one-dot, chain-line arrow indicates the flow of RGB data (imaging data simultaneously processed), and the two-dot, chain-line arrow indicates the flow of YC data (imaging data converted in color). The RGB data or the YC data corresponds to the image data described above.

Various control values are set to the imaging control circuit 23 in accordance with the reading scheme for the imaging element 21. The imaging control circuit 23 outputs a control signal to the imaging element 21 in accordance with the control values, in order to read the pixel data from the imaging element 21. The imaging control circuit 23 has a reading scheme setting unit 231 and a mixing ratio setting unit 232.

The scheme of reading pixel data from the imaging element 21 is set to the reading scheme setting unit 231 in accordance with the setting data supplied from the CPU 29. The reading scheme is set in accordance with the operating state of the camera 1. It may be demanded that the pixel data should be read from the imaging element 21 in real time (to display a live view or to record a moving picture). In this case, the pixel data coming from pixels of the same color may be mixed and then read, or the pixel data from only some of the pixels may be read, discarding the data generated at the other pixels. Instead, high image quality may be demanded, rather than the real-time data reading (in order to, for example, record a still image). If this is the case, the pixel data are not mixed or the data generated in some pixels are not discarded, thereby to maintain the high resolution. The CPU 29 determines the operating state of the camera 1, and generates setting data, which causes the camera 1 to read data in an appropriate reading scheme.

An interval at which pixel data is read from the pixels arranged in the horizontal and vertical directions is set in the mixing ratio setting unit 232 in order to mix the pixel data items or to discard some of the pixel data items. The reading scheme setting unit 231 may set a reading scheme (2×2 pixel-mixture reading scheme) of mixing four pixels, i.e., two arranged in the horizontal direction and two arranged in the vertical direction, thereby forming one pixel, or may set a reading scheme (2×2 pixel-discard reading scheme) of discarding four pixels, i.e., two arrange in the horizontal direction and two arranged in the vertical direction, thereby forming one pixel. In either case, value 2 is set as the horizontal reading interval and value 2 is set as the vertical reading interval.

The image processing unit 31 has a gain adjusting unit 311, an interpolation ratio determining unit 312, a pixel interpolating unit 313, a developing unit 314, and a color converting unit 315. The image processing unit 31 further has a compressing/expanding unit (not shown).

The gain adjusting unit 311 adjusts the gain of the pixel data coming from the phase-difference detecting pixels. The region of each phase-difference detecting pixel is shielded, at one region. Therefore, less light is applied to the phase-difference detecting pixels than to the imaging pixels, from the same part of the object, which has the same brightness. Since a region of each phase-difference detecting pixel is shielded at one region, the gain adjusting unit 311 adjusts the gain, making up for the pixel data by the lost due to light reduction.

The interpolation ratio determining unit 312 determines the application ratio of the pixel data generated by the phase-difference detecting pixels, from the reading scheme set by the imaging control circuit 23 and the mixing ratio calculated from the horizontal-vertical reading interval set by the mixing ratio setting unit 232. The application ratio is the weighting coefficient used in a weighted addition, i.e., adding the gain-adjusted pixel data output from the phase-difference detecting pixels to the pixel data output from the pixels around the phase-difference detecting pixels. More specifically, in the reading scheme using a large mixing ratio for the pixel data output from the phase-difference detecting pixels, the weighting coefficient is increased for the pixel data output from the pixels around the phase-difference detecting pixels, and is decreased for the gain-adjusted pixel data output from the phase-difference detecting pixels.

The pixel interpolating unit 313 corrects the pixel data output from the phase-difference detecting pixels, on the basis of the application ratio (i.e., weighting coefficient) determined by the interpolation ratio determining unit 312.

The developing unit 314 performs a synchronization process (de-mosaicing process), a noise reduction (NR) process, a white balancing (WB) process, an edge emphasizing process, etc. on the imaging data including the pixel data interpolated by the pixel interpolating unit 313. The imaging data output from the imaging element 21 having a color filter of the Bayer arrangement is composed of pixel data items, each of which has one color component. In the synchronization process, the imaging data becomes RGB data composed of pixel data items, each piece of pixel data having three color components: R, G and B.

The color converting unit 315 performs a process on the RGB data acquired in the developing unit 314, generating display image data or record image data. This process includes a process of converting the RGB data to YC data by means of, for example, matrix operation, and a gamma correcting process performed on the YC data.

Figure 3:
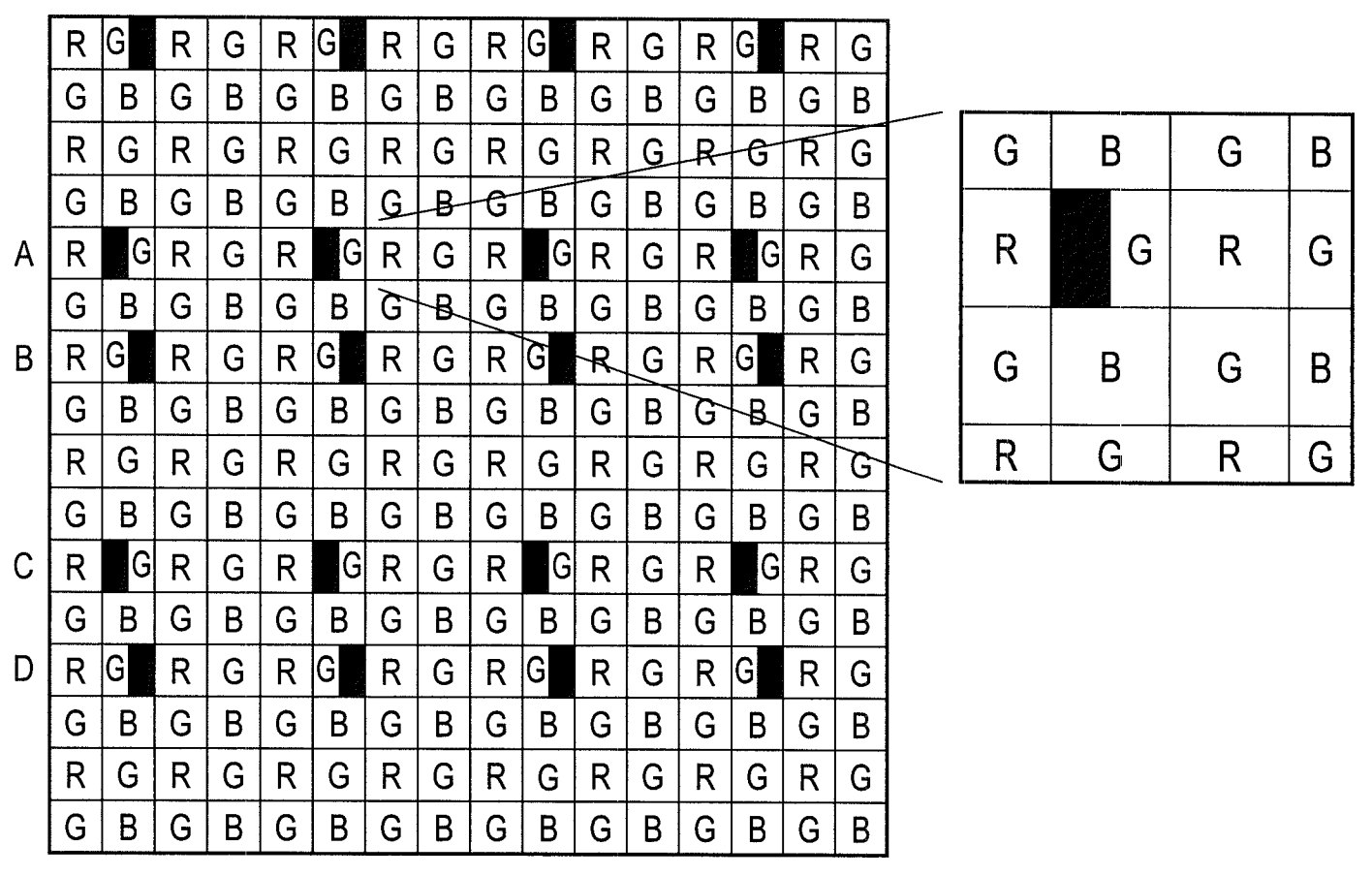

The configuration of the imaging element 21 will be described with reference to FIG. 3. FIG. 3 is a diagram showing how the pixels are arranged in the imaging element 21. Some of the pixels are magnified and shown on the right-hand side of FIG. 3. FIG. 3 shows pixels in the Bayer arrangement. Nonetheless, the pixel arrangement is not limited to the Bayer arrangement. Various available arrangements can be utilized.

As described above, the imaging element 21 has lines in which R pixels and G (Gr) pixels are alternately arranged in the horizontal direction, and lines in which G (Gb) pixels and B pixels are alternately arranged in the horizontal direction. In other words, pixel sets, each consisting of four pixels, i.e., Gr pixel, R pixel, Gb pixel and B pixel magnified in the right part of FIG. 3, are repeatedly arranged in both the horizontal direction and the vertical direction.

In this embodiment, phase-difference detecting pixels are arranged at some of the imaging pixels, respectively. The phase-difference detecting pixels are pixels, each having the left half or the right half covered with shield film. In the case shown in FIG. 3, the phase-difference detecting pixels, each having the left half covered with shield film (hereinafter called "right-open phase-difference detecting pixel") are arranged close to, in a vertical direction, the phase-difference detecting pixels, each having the right half covered with shield film (hereinafter called "left-open phase-difference detecting pixel").

The more pixels the imaging element has, the smaller the area each pixel occupies. The same image is therefore focused on any pixels adjacent to one another. This is why the phase-difference detecting pixels are arranged as shown in FIG. 3. Thus, a phase-difference detecting pixel in low A and a phase-difference detecting pixel in low B cooperate to detect a phase difference, and a phase-difference detecting pixel in low C and a phase-difference detecting pixel in low D cooperate to detect a phase difference.

As shown in FIG. 3, the shielded region of any phase-difference detecting pixel is the left half or the right half. The phase-difference detecting pixel can therefore detect a phase difference in the horizontal direction. The shielded region of any phase-difference detecting pixel may be the upper half or the lower half. In this case, the phase-difference detecting pixel can detect a phase difference in the vertical direction. Further, the shielded region of any phase-difference detecting pixel may be an upper-left part or a lower-right part. If so, the phase-difference detecting pixel can detect a phase difference in an oblique direction. Moreover, the shielded region of any phase-difference detecting pixel need not be half (½) if it has a sufficient area. Furthermore, any phase-difference detecting pixel is a G pixel as shown in FIG. 3. Instead, some R pixels or some B pixels may be used as phase-difference detecting pixels.

In the imaging element 21 shown in FIG. 3, the phase-difference detecting pixel 21b is shielded, at one part, thus dividing the pupil. Nonetheless, it is sufficient for any phase-difference detecting pixel to receive either of two light beams coming, respectively, from the object through two different parts of the photographing lens 11. In view of this, the phase-difference detecting pixel may not be shielded in part from light, and a micro-lens may be used to divide the pupil.

Figure 4A:
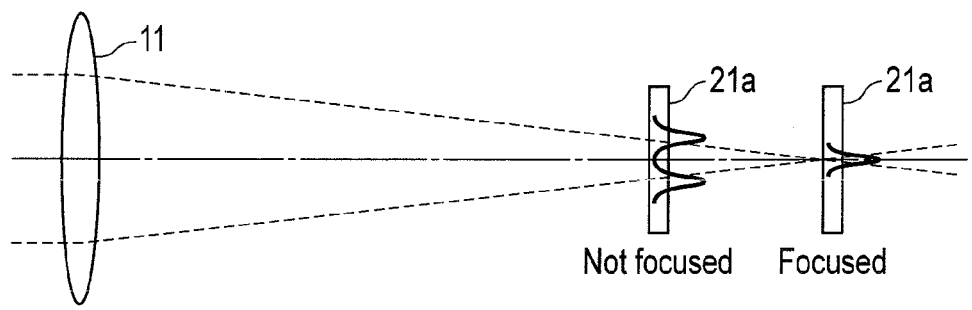
FIG. 4A is a diagram showing how an image is focused at the imaging pixels.
Figure 4B:
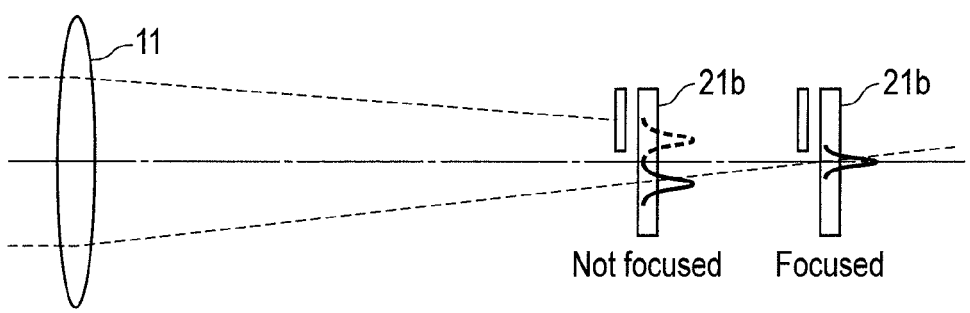
FIG. 4B is a diagram showing how an image is focused at an phase-difference detecting pixels.

The principle of focal point detection by using such phase-difference detecting pixels as shown in FIG. 3 will be explained with reference to FIG. 4A and FIG. 4B. FIG. 4A shows how an image is focused at an imaging pixel 21a, and FIG. 4B shows how an image is focused at a phase-difference detecting pixel 21b.

Assume that the object is a point light source. Then, if the photographing lens 11 is in focus, two light beams emitted from the object and passed through different pupil regions symmetric to the optical axis of the photographing lens 11 are focused at the same position on the imaging element 21.

The peak position of the image formed at the imaging pixel 21a coincides with the peak position of the image formed at the phase-difference detecting pixel 21b, as viewed in the horizontal direction. However, the peak of only one of these images is detected because the phase-difference detecting pixel 21b is shielded from light at one part. Consequently, the light decreases in amount at the phase-difference detecting pixel 21b.

If the photographing lens 11 is out of focus, the two light beams emitted from the object and passed through different pupil regions symmetric to the optical axis of the photographing lens 11 are focused at different positions on the imaging element 21. In other words, the two images formed by these two light beams have a phase difference. The phase difference is detected from the correlation between the images detected at the left-open phase-difference detecting pixel and the right-open phase-difference detecting pixel. From the phase difference so detected, the defocusing value and defocusing direction of the photographing lens 11 will be determined.

As viewed in the horizontal direction, the images corresponding to the light beams coming from the object through the different pupil regions are formed at the imaging pixel 21a. On the other hand, only one image corresponding to one of the light beams coming from the object through the different pupil regions is formed at the phase-difference detecting pixel 21b. Consequently, the peak position of the image formed at the imaging pixel 21a does not coincide with the peak position of the image formed at the phase-difference detecting pixel 21b. An image shift will inevitably occur. Further, the amount of light will decrease because the phase-difference detecting pixel 21b is shielded from light at one part.

If the focus is detected while a moving picture is being photographed or while a live view is being displayed, the phase-difference detecting pixel 21b will cause an image shift. The influence of the image shift is reduced by means of pixel interpolation, which will be described later.

How the imaging apparatus according to this embodiment operates will be explained below. FIG. 5 is a flowchart showing how the imaging apparatus records (or photographs) a moving picture. The imaging apparatus starts recording a moving picture if the release button is pushed in, for example, the moving-picture photographing mode. The CPU 29 performs the processes shown in the flowchart of FIG. 5, in accordance with the programs stored in the ROM 43. Although FIG. 5 shows how a moving picture is recorded, the imaging control method according to this embodiment can be applied to the recording of a still picture and the displaying of a live view, as well.

At the beginning of the operation sequence of FIG. 5, the CPU 29 starts reading the imaging data (Step S101). More precisely, the CPU 29 inputs the setting data for the present operating mode to the reading scheme setting unit 231 of the imaging control circuit 23. The imaging control circuit 23 starts controlling the reading of pixel data from the imaging element 21, in accordance with the setting data.

In the case shown in FIG. 5, the setting data input accords with the reading scheme for use in recording moving pictures. As the reading scheme is set to the reading scheme setting unit 231, a pixel reading interval is set to the mixing ratio setting unit 232. At the interval set, pixel data will be read from the horizontal pixels and vertical pixels, which will be mixed together or some of which will be discarded. To perform the 2×2 pixel-mixture reading or the 2×2 pixel-discard reading, the interval value 2 is set for both the horizontal reading and the vertical reading. To perform the 3×3 pixel-mixture reading or the 3×3 pixel-discard reading, the interval value 3 is set for both the horizontal reading and the vertical reading.

After the reading scheme has been set to the imaging control circuit 23, an image signal, in which pixels are mixed or from which some pixels have been discarded, is read in the reading scheme set to the imaging control circuit 23. The image signal so read from the imaging element 21 is converted by the ADC 27 to digital imaging data. The digital imaging data is temporarily stored in the DRAM 41.

Next, the CPU 29 performs a focus detecting process (Step S102). More precisely, the CPU 29 causes the focus detecting circuit 33 to detect the focal point. In response to the instructions for the focus detecting process, the focus detecting circuit 33 reads the pixel data pertaining to the phase-difference detecting pixels, from the imaging data temporarily stored in the DRAM 41. From this pixel data, the defocus direction and defocus value of the photographing lens 11 are calculated by the known phase-difference detecting method.

Then, the CPU 29 performs a mixing ratio calculating process (Step S103). In this step, the CPU 29 calculates a mixing ratio to make the interpolation ratio determining unit 312 compute an interpolation ratio. The "mixing ratio" is a ratio of the data generated by the phase-difference detecting pixel to the pixel data acquired by the pixel-mixture reading or pixel-discard reading.

The mixing ratio calculating process will be explained. If the pixel data is read from the imaging element 21 in the pixel-mixture reading scheme or pixel-discard reading scheme, the pixel data generated by any phase-difference detecting pixel may be mixed with the pixel data. The mixing ratio of the pixel data of the mixed phase-difference detecting pixel read from the imaging element 21 is calculated by the CPU 29.

Figures 6A, 6B:
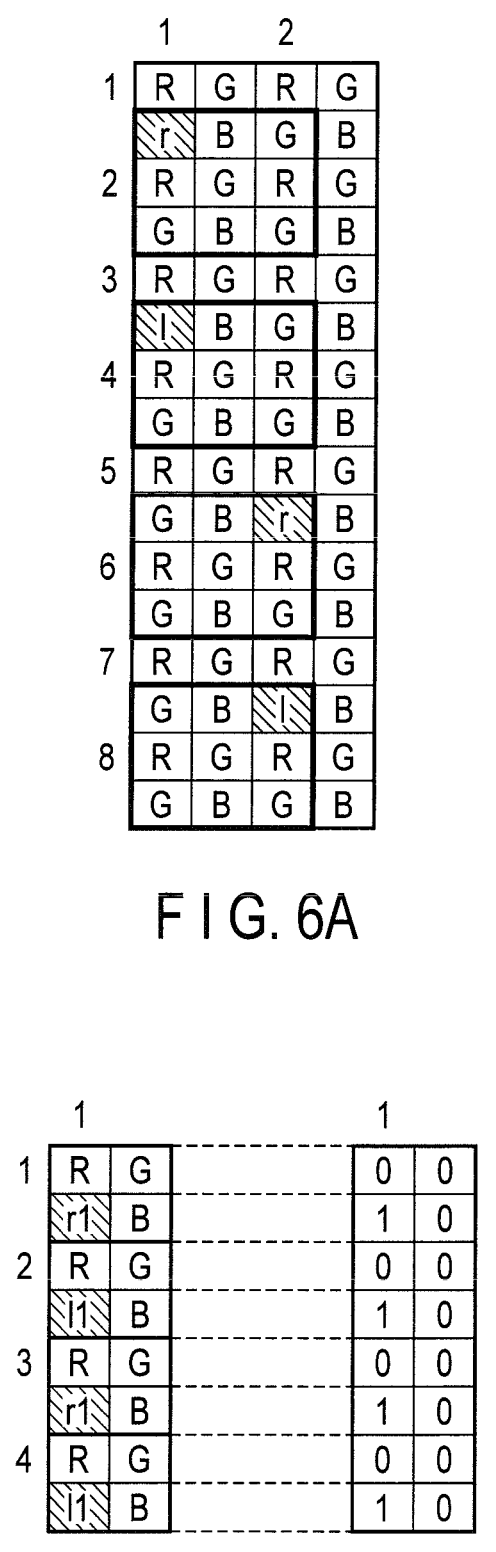

FIG. 6A is a diagram showing how pixels are arranged before the 2×2 pixel-mixture reading. FIG. 6B is a diagram showing how pixels are arranged after the 2×2 pixel-mixture reading. In FIG. 6A and FIG. 6B, the numbers at the upper and left sides of the tables are used to indicate the coordinates of each pixel concerned. Hereinafter, two horizontal pixels and two vertical pixels including R pixel labeled with a number are considered identical in coordinate. In FIG. 6A, "r" indicates phase-difference detecting pixels shielded from light on the left half thereof (i.e., right-open phase-difference detecting pixels), and "l" indicates any phase-difference detecting pixels shielded from light on the right half thereof (i.e., left-open phase-difference detecting pixels). In the left part of FIG. 6B, "r" means that a right-open phase-difference detecting pixel is mixed in the pixel, and "l" means that a left-open phase-difference detecting pixel is mixed in the pixel. In FIG. 6B, the number attached to r indicates how many right-open phase-difference detecting pixels are mixed in the pixel, and the number attached to l indicates how many left-open phase-difference detecting pixels are mixed in the pixel. The numbers specified in the right part of FIG. 6B, show the total number of phase-difference detecting pixels mixed in each pixel.

To perform the 2×2 pixel-mixture reading from the pixels arranged as shown in FIG. 6A, all pixels having the same color of the data of two pixels arranged in the horizontal direction and the data of two pixels arranged in the vertical direction, are added altogether. The mixing method is, for example, arithmetic averaging, multiplication, or arithmetic weighted averaging.

The data items of four R pixels at coordinates (1,1), (1,2), (2,1) and (2,2), respectively, in the pixel arrangement of FIG. 6A, for example, are mixed, thereby obtaining the data about the R pixel at coordinates (1,1) in FIG. 6B. The data items of any pixels other than the R pixels are mixed in a similar manner. Assume that a phase-difference detecting pixel is arranged at the position of a G(Gb) pixel. Then, the data of the phase-difference detecting pixel will be mixed with the pixel data obtained by mixing the data of Gb pixels at respective positions. That is, if the pixel data items in the thick solid-line frames shown in FIG. 6A are mixed, the resultant mixture will contain the data of the phase-difference detecting pixel. As seen from FIG. 6B, in the 2×2 pixel-mixture reading, the pixel data at each Gb position contains the data of one phase-difference detecting pixel after the mixing of pixel data. Any pixel providing data containing the data of such a phase-difference detecting pixel can be used as a phase-difference detecting pixel even after the 2×2 pixel-mixture reading.

Figure 7A:
FIG. 7A is a diagram showing how pixels are arranged before the 3×3 pixel-mixture reading.
Figure 7B:
FIG. 7B is a diagram showing how pixels are arranged after the 3×3 pixel-mixture reading.

FIG. 7A is a diagram showing how pixels are arranged before the 3×3 pixel-mixture reading. FIG. 7B is a diagram showing how pixels are arranged after the 3×3 pixel-mixture reading.

In the 3×3 pixel-mixture reading shown in FIG. 7A, all pixels having the same color of the data items of three pixels arranged in the horizontal direction and the data of three pixels arranged in the vertical direction, are added altogether. For example, the data items of nine R pixels at coordinates (2,1), (2,2), (2,3), (3,1), (3,2), (3,3), (4,1), (4,2) and (4,3), respectively, in the pixel arrangement of FIG. 7A, for example, are mixed, thereby obtaining the data about the R pixel at coordinates (1,1) in FIG. 7B. The data items of any pixels other than the R pixels are mixed in a similar manner. In the case shown in FIG. 7A and FIG. 7B, the data items of the first row are not mixed at all. Nonetheless, they may be mixed.

Assume that a phase-difference detecting pixel is arranged at the position of a G(Gb) pixel, as described above. Then, the data of the phase-difference detecting pixel will be mixed with the pixel data obtained by mixing the data of Gb pixels at respective positions. As seen from FIG. 7B, in the 3×3 pixel-mixture reading, the number of data items of the phase-difference detecting pixels which are mixed differs, depending on the positions of these pixels.

The mixing ratio α is calculated for each pixel position by using the following equation (1):

$$\alpha = n/(h \times v) \quad (1)$$

where n is the number of data items of the phase-difference detecting pixels contained in the pixel data read, h is the interval of reading data in the horizontal direction during the pixel-mixture reading or pixel-discard reading, and v is the interval of reading data in the vertical direction during the pixel-mixture reading or pixel-discard reading.

In the 2×2 pixel-mixture reading, for example, a is ¼, regardless of the position of the Gb pixel. In the 3×3 pixel-mixture reading, α is 1/9 to 5/9, depending on the position of the Gb pixel.

As described above, the mixing ratio is calculated whenever a moving picture is recorded. Instead, however, mixing ratios may be calculated beforehand for the respective reading schemes. If so, when a reading scheme is set, it suffices to acquire the mixing ratio associated with the reading scheme.

How the imaging apparatus according to this embodiment operates will be further explained, referring to FIG. 5 again. The CPU 25 then adjusts the gain of the pixel data (Step S104). More specifically, the CPU 29 causes the gain adjusting unit 311 of the image processing unit 31 to adjust the gain of the pixel data. As described above, the phase-difference detecting pixel 21b is shielded from light at one part, and the input light decreases in amount. In the gain adjusting process, the pixel data output from the phase-difference detecting pixel 21b is corrected, compensating for the decrease in light amount. Each piece of pixel data may, however, contain not only the data of the pixel, but also the data of the phase-difference detecting pixel. In view of this, the gain adjusting value is determined from the mixing ratio of the data of the phase-difference detecting pixel. For simplicity of explanation, assume that the phase-difference detecting pixel, with the left or right half shielded from light as shown in FIG. 3, receives half (½) the input light. Then, the gain adjusting value β is given by the following equation:

$$\beta = (h \times v)/((h \times v) - n \times 0.5) \quad (2)$$

In the 2×2 pixel-mixture reading, for example, β=4/3.5, regardless of the position of the Gb pixel. In the 3×3 pixel-mixture reading, α is 9/8.5 to 9/7, depending on the position of the Gb pixel.

The gain adjusting process is, more precisely, a process of multiplying the data of the phase-difference detecting pixel by the gain adjusting value β defined by the equation (2).

The equation (2) is based on the assumption that the phase-difference detecting pixel receives half (½) the input light. However, the light the phase-difference detecting pixel receives changes in accordance with the diameter of the photographing lens 11 and the aperture diameter of the diaphragm 13. In view of this, the value of 0.5 in the equation (2) is changed in accordance with the diameter of the photographing lens 11 and the aperture diameter of the diaphragm 13.

Next, the CPU 29 performs a pixel interpolating process (Step S105). More specifically, the CPU 29 causes the interpolation ratio determining unit 312 and pixel interpolating unit 313 of the image processing unit 31 to perform the pixel interpolating process. The pixel interpolating process will be explained later in detail.

The CPU 29 then drives the photographing lens 11 (Step S106). The CPU 29 controls the drive unit 17 in accordance with the defocus direction and defocus value of the photographing lens 11, which the focus detecting circuit 33 has detected in Step S102. So controlled, the drive unit 17 drives the photographing lens 11 to the focal point.

Then, the CPU 29 performs image processing (Step S107). That is, the CPU 29 causes the developing unit 314 and color converting unit 315 of the image processing unit 31 to perform a developing process and a color converting process, respectively, on the imaging data acquired in the pixel interpolating process (Step S105) and temporarily stored in the DRAM 41. The process parameters used in the developing process and color converting process are the parameters for recording pictures, which are stored in, for example, the ROM 43.

Next, the CPU 29 records, in recording medium 45, the image data obtained in the image processing and temporarily stored in the DRAM 14 (Step S108).

The CPU 29 then determines whether the recording of the moving picture should be stopped or not (Step S109). In Step S109, the CPU 29 determines whether the release button is pushed or not at the console 19. If the release button is pushed again, the CPU 29 determines that the recording of the moving picture should be stopped.

In Step S109, the CPU 29 may determine that the recording of the moving picture should not be stopped. In this case, the CPU 29 returns the operation to Step S101. The recording of the moving picture is thereby continued. If the CPU 29 determines, in Step S109, that the recording of the moving picture should be stopped, the CPU 29 terminates the operation sequence of FIG. 5.

FIG. 8 is a flowchart showing the pixel interpolating process. The pixel interpolating process is performed mainly by the interpolation ratio determining unit 312 and the pixel interpolating unit 313.

When the operation sequence of FIG. 8 is started, the interpolation ratio determining unit 312 determines whether the imaging data to process contains the data of the phase-difference detecting pixel (Step S201). The coordinate data of the phase-difference detecting pixel has been stored in, for example, the ROM 43. From the coordinate data the interpolation ratio determining unit 312 determines whether the imaging data to process contains the data of the phase-difference detecting pixel. As described above, whether the imaging data to process contains the data of the phase-difference detecting pixel is also determined from the reading scheme used. Therefore, the interpolation ratio determining unit 312 first acquires the setting data of the reading scheme setting unit 231 and mixing ratio setting unit 232, then refers to the coordinate data of the phase-difference detecting pixel, and finally determines whether the imaging data contains the data of the phase-difference detecting pixel.

In Step S201, the imaging data may be found not to contain the data of the phase-difference detecting pixel. In this case, the operation sequence of FIG. 8 is terminated. If the imaging data is found to contain the data of the phase-difference detecting pixel in Step S201, the interpolation ratio determining unit 312 obtains the mixing ratio calculated in the mixing ratio calculating process (Step S202).

Next, the interpolation ratio determining unit 312 determines the use ratio of the data of the phase-difference detecting pixel (Step S203). The use ratio, af_pixel_weight, and the use ratio of the data of the adjacent pixels, near_pixel_weight, are given as follows:

$$af\_pixel\_weight = 1 - \alpha$$

$$near\_pixel\_weight = \alpha \quad (3)$$

Then, the pixel interpolating unit 313 performs weighted addition on the data of the phase-difference detecting pixel and the data of the adjacent pixels (Step S204), based on the following equation (4):

$$\text{correct\_pixel} = af\_pixel\_weight \times af\_pixel + near\_pixel\_weight \times (pixel\_h\_1 + pixel\_h\_2 + pixel\_v\_1 + pixel\_v\_2) \quad (4)$$

where correct_pixel is the pixel data value corrected through the weighted addition; af_pixel is the data value of the phase-difference detecting pixel (actually, the data of some pixels including the phase-difference detecting pixel); pixel_h_1 is the data value of the +1 pixel of the same color located on the left of the phase-difference detecting pixel (i.e., upper-left pixel in the Bayer arrangement); pixel_h_2 is the data value of the +1 pixel of the same color located on the right of the phase-difference detecting pixel (i.e., lower-right pixel in the Bayer arrangement); pixel_v_1 is the data value of the +1 pixel of the same color located above the phase-difference detecting pixel (i.e., the upper-right pixel in the Bayer arrangement); and pixel_v_2 is the data value of the +1 pixel of the same color located below the phase-difference detecting pixel (i.e., the lower-left pixel in the Bayer arrangement).

The weighted addition of the equation (4) is thus performed on each phase-difference detecting pixel. After all phase-difference detecting pixels have been subjected to the weighted addition, the process of FIG. 8 is terminated.

As explained above, if the pixel mixing or pixel discarding is performed in this embodiment, the use ratio of the data of the phase-difference detecting pixel to the data interpolated from the adjacent pixels is changed in accordance with the mixing ratio of the data of each phase-difference detecting pixel after the pixel mixing or pixel discarding. Thus, if the mixing ratio of the data of the phase-difference detecting pixel is low, the use ratio of this data adjusted in gain will become high, and no over correction will take place, and the image sharpness can be prevented from decreasing. If the mixing ratio of the data of the phase-difference detecting pixel is high, the use ratio of the data of the adjacent pixels will become high, and the influence of image shift due to the use of the phase-difference detecting pixel can be controlled.

The invention has been explained with reference to an embodiment. Nonetheless, the invention is not limited to the embodiment described above. Various changes and modifications can be, of course, made within the scope and spirit of the invention. In the description related to any flowchart, the words "First," "Next" and the like are used. However, it is not absolutely necessary to perform the steps in the order mentioned.

The processes performed in the embodiment can be stored in the form of programs that the CPU 29 can execute. Alternatively, the processes can be stored in an external recording medium, such as a memory card (e.g., ROM card or RAM card), a magnetic disk (e.g., floppy disk or hard disk), an optical disk (e.g., CD-ROM or DVD), or a semiconductor memory, and can therefore be distributed in the form of a recording medium. The CPU 29 can read the programs stored in the external recording medium, and may be controlled by the programs so read, thereby to perform the above-mentioned processes.

Further, the embodiments described above include various phases of the invention. The components disclosed herein may be combined in various ways to make various inventions. For example, even if some components of any embodiment described above are not used, the resulting configuration can be considered as the invention so long as it solves the problem specified above and achieves the advantages described above.

What is claimed is:

1. An imaging apparatus comprising:
    an imaging element including imaging pixels and at least one phase-difference detecting pixel arranged among the imaging pixels to detect a focal point;
    a reading scheme setting unit configured to set a reading scheme for reading pixel data from the imaging pixels and the at least one phase-difference detecting pixel of the imaging element in a mixed manner to provide mixed pixel data; and
    an image processing unit configured to correct any of the mixed pixel data including pixel data of the at least one phase-difference detecting pixel, the image processing unit including
        a gain adjusting unit configured to adjust a gain of any of the mixed pixel data including pixel data of any of the at least one phase-difference detecting pixel, in accordance with the reading scheme set by the reading scheme setting unit, to provide gain adjusted pixel data,
        a pixel interpolating unit configured to perform weighted arithmetic addition of (1) the gain adjusted pixel data, and (2) the mixed pixel data of pixels surrounding one or more pixels corresponding to the gain adjusted pixel data, and
        an interpolation ratio determining unit configured to determine a weighting coefficient used in the weighted arithmetic addition performed by the pixel interpolating unit, in accordance with the reading scheme set by the reading scheme setting unit,
    wherein a mixing ratio of the pixel data of the at least one phase-difference detecting pixel in the mixed pixel data read in accordance with the reading scheme is determined in accordance with an arrangement of any of the at least one the phase-difference detecting pixel included in the mixed pixel data, and
    wherein the pixel interpolating unit changes the weighting coefficient of the gain adjusted pixel data, depending on the mixing ratio determined.

2. The imaging apparatus according to claim 1, wherein the reading scheme setting unit sets an interval of reading the pixel data in a horizontal direction and an interval of reading the pixel data in a vertical direction.

3. The imaging apparatus according to claim 1, wherein the pixel data read from the imaging element are subjected to arithmetic averaging, multiplication, or arithmetic weighted averaging.

4. The imaging apparatus according to claim 1, wherein the pixel interpolating unit determines the mixing ratio as a number of the at least one phase-difference detecting pixels included in the mixed pixel data.

5. The imaging apparatus according to claim 1, wherein the gain adjusting unit changes the value for adjusting the gain of the pixel data in accordance with the reading scheme.

6. A method for controlling an imaging apparatus, comprising:
    setting a reading scheme for reading, in a mixed manner to provide mixed pixel data, pixel data from the imaging pixels and a phase-difference detecting pixel of an imaging element, the phase-difference detecting pixel being arranged among the imaging pixels and configured to detect a focal point;

adjusting a gain of any of the mixed pixel data including the pixel data of the phase-difference detecting pixel in the reading scheme set, to provide gain adjusted pixel data;

performing weighted arithmetic addition on the one item of (1) the gain adjusted pixel data and (2) the mixed pixel data of pixels surrounding one or more pixels corresponding to the gain adjusted pixel data; determining a weighting coefficient used in the weighted arithmetic addition, in accordance with the reading scheme set;

determining a mixing ratio of the pixel data of the phase-difference in the pixel data read in accordance with the reading scheme set in accordance with an arrangement of the phase-difference detecting pixel included in the mixed pixel data; and changing the weighting coefficient of the gain adjusted pixel data depending on the mixing ratio determined.

7. An imaging apparatus comprising:

an imaging element including imaging pixels and a phase-difference detecting pixel arranged among the imaging pixels to detect a focal point;

a reading scheme setting unit configured to set a reading scheme for reading pixel data from the imaging pixels and phase-difference detecting pixel of the imaging element in a discarded manner such that at least some of the pixel data is discarded pixel data; and an image processing unit configured to correct the pixel data of the phase-difference detecting pixel, the image processing unit including
- a gain adjusting unit configured to adjust a gain of any of the pixel data of the phase-difference detecting pixel, in the reading scheme set by the reading scheme setting unit, to provide gain adjusted pixel data;
- a pixel interpolating unit configured to perform weighted arithmetic addition of (1) on the gain adjusted pixel data, and (2) the pixel data of pixels surrounding one or more pixels corresponding to the gain adjusted pixel data; and
- an interpolation ratio determining unit configured to determine a weighting coefficient used in the weighted arithmetic addition performed by the pixel interpolating unit, in accordance with the reading scheme set by the reading scheme unit, wherein a mixing ratio of the pixel data of the phase-difference detecting pixel in the pixel data read in accordance with the reading scheme is determined in accordance with a position of the discarded pixel data and an arrangement of the phase-difference detecting pixel, and wherein the pixel interpolating unit changes the weighting coefficient of the gain adjusted pixel data depending on the mixing ratio determined.

8. The imaging apparatus according to claim 7, wherein the reading scheme setting unit sets an interval of reading the pixel data in a horizontal direction and an interval of reading the pixel data in a vertical direction.

9. A method for controlling an imaging apparatus, comprising:

setting a reading scheme for reading, in a discarded manner, pixel data from the imaging pixels and phase-difference detecting pixel of an imaging element such that at least some of the pixel data is discarded pixel data, the phase-difference detecting pixel arranged among the imaging pixels and configured to detect a focal point; and adjusting a gain of the pixel data of the phase-difference detecting pixel, in the reading scheme, to provided gain adjusted pixel data;

performing weighted arithmetic addition on (1) the gain adjusted pixel data and (2) the pixel data of pixels surrounding one or more pixels corresponding to the gain adjusted pixel data;

determining a weighting coefficient used in the weighted arithmetic addition, in accordance with the reading scheme set; and determining a mixing ratio of the gain adjusted pixel data in accordance with a position of the discarded pixel data and arrangement of the phase-difference detecting pixel, wherein the act of determining the weighting coefficient includes changing the weighting coefficient of the gain adjusted pixel data depending on the mixing ratio determined.

* * * * *